Nov. 27, 1962 W. J. CREHAN ETAL 3,065,535
METHODS OF MAKING COATED METAL BODIES AND COMPOSITE METAL SHEETS
Original Filed June 10, 1955
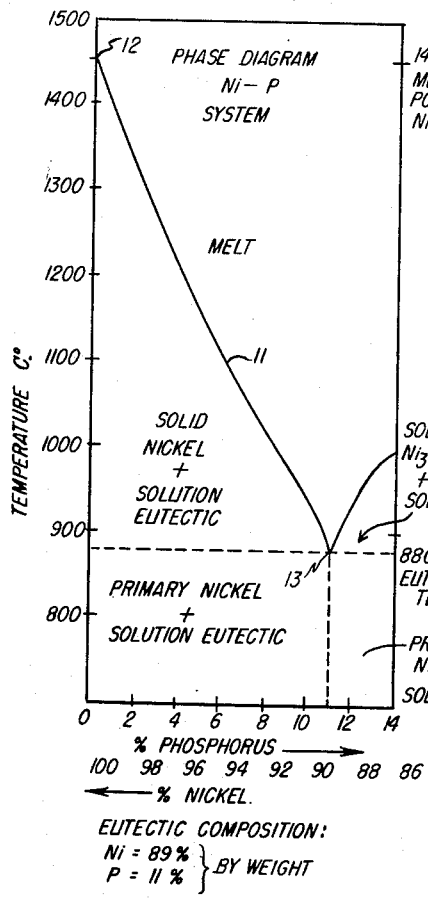
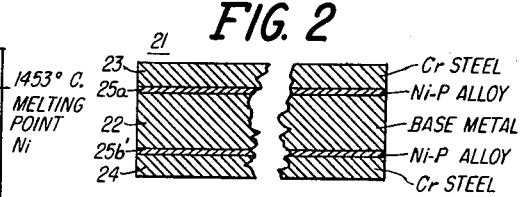
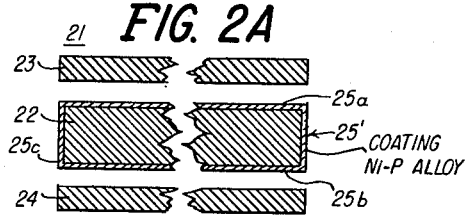
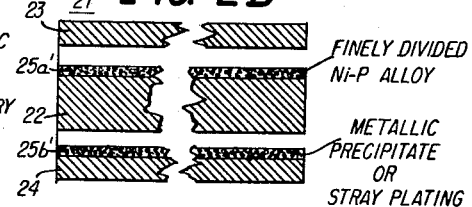
INVENTORS
WILLIAM J. CREHAN
WALTER F. KLOUSE
PAUL TALMEY
BY
Smith, Brangley, Baird & Clayton,
attys.

United States Patent Office 3,065,535
Patented Nov. 27, 1962

3,065,535
METHODS OF MAKING COATED METAL BODIES AND COMPOSITE METAL SHEETS
William J. Crehan, Hinsdale, Walter F. Klouse, Chicago, and Paul Talmey, Barrington, Ill., assignors to General American Transportation Corporation, Chicago, Ill., a corporation of New York
Original application June 10, 1955, Ser. No. 514,472, now Patent No. 2,908,568, dated Oct. 13, 1959. Divided and this application Aug. 16, 1957, Ser. No. 678,683
6 Claims. (Cl. 29—484)

The present invention relates to the method of making coated metal bodies and composite metal sheets, and more particularly to such bodies and composite sheets incorporating nickel-phosphorus alloy coatings. This application is a division of the copending application of William J. Crehan, Walter F. Klouse and Paul Talmey, Serial No. 514,472, filed June 10, 1955, now Patent No. 2,908,568, granted October 13, 1959.

It is an object of the invention to provide an improved method of coating a base metal body with a nickel-phosphorus alloy.

Another object of the invention is to provide an improved method of uniting two metal bodies that involves the step of fusing a nickel-phosphorus alloy layer therebetween and into wetting and bonding relation with the adjacent surfaces of the two metal bodies.

A further object of the invention is to provide a uniting method of the character described that is entirely operative even though one or both of the bodies are formed of a metal having a high chromium content.

A further object of the invention is to provide a method of wetting and bonding the surface of a chromium alloy, without melting the same, and without the utilization of an external flux, and involving only contacting the chromium alloy with a melt of nickel-phosphorus alloy.

A further object of the invention is to provide an improved method of making a composite metal sheet comprising two individual metal sheets united by an intermediate layer of nickel-phosphorus alloy.

A still further object of the invention is to provide an improved method of making a composite metal sheet comprising a base metal sheet clad with a chromium alloy sheet.

Further features of the invention pertain to the particular arrangement of the steps of the method; whereby the above-outlined and additional operating features thereof are attained.

The invention, both as to its organization and method of operation, together with further objects and advantages thereof, will best be understood by reference to the following specification taken in connection with the accompanying drawings, in which:

FIGURE 1 is a phase diagram of the nickel-phosphorus system, as far as it is pertinent to the nickel-phosphorus alloys that are employed in the coatings and in the composite sheets of the present invention, and illustrating the mutual relationships among phase and temperature and composition in these nickel-phosphorus alloys;

FIG. 2 is an enlarged fragmentary sectional view of a composite metal sheet, that is made in accordance with the method of the present invention;

FIG. 2A is an enlarged fragmentary exploded sectional view of the elements of the composite sheet shown in FIG. 2, and illustrating a step involved in the method of making the same;

FIG. 2B is an enlarged fragmentary exploded sectional view of the elements of the composite sheet shown in FIG. 2, and illustrating modified steps involved in the method of making the same;

FIG. 3 is an enlarged fragmentary sectional view of a modified form of the composite metal sheet;

FIG. 4 is an enlarged fragmentary sectional view of another modified form of the composite metal sheet; and FIG. 5 is an enlarged fragmentary sectional view of a further modified form of the composite metal sheet.

At the outset, it is noted that in the operation of a continuous chemical nickel plating system of the character of that disclosed in U.S. Patent No. 2,658,839, granted on November 10, 1953 to Paul Talmey and William J. Crehan, there is employed a plating bath of the nickel cation-hypophosphite anion type; and in the plating operation, nickel cations are reduced to metallic nickel and deposited upon the catalytic surface of the object undergoing the chemical nickel plating operation, and hypophosphite anions are correspondingly oxidized to phosphite anions and accumulate in the plating bath. In accordance with the method of Talmey and Crehan, the plating bath is continuously or periodically regenerated by the addition of nickel cations and hypophosphite ions, thereby to compensate the same for the depletion of these ions resulting from the plating reactions mentioned. Also, these plating reactions in the plating bath are productive of hydrogen ions, whereby hydroxyl ions are added in the regeneration to maintain the desired pH of the plating bath.

While this method greatly extends the useful life of the plating bath, it does not prevent the build-up of phosphite anions and alkali metal salts therein (assuming that the regeneration involves the addition of nickel sulfate, sodium hypophosphite and sodium hydroxide); whereby ultimately it is necessary to discard the plating bath, as a result of the build-up of high concentrations therein of phosphite anions, sulfate anions and sodium cations. Specifically, care must be exercised in this connection to prevent precipitation of nickel phosphite in the plating bath, since such precipitate serves as growth nuclei for the formation of "metallic precipitate" therein, with the resulting "random decomposition" of the plating bath. Specifically, the reactions involving the formation of the metallic precipitate in the plating bath are autocatalytic; whereby the formation of any substantial metallic precipitate therein effects the total decomposition of the plating bath very quickly and throughout the body thereof entirely at random and altogether independently of the catalytic surface of the body undergoing the plating operation.

Thus, a chemical nickel plating bath becomes "spent" when the phosphite anion concentration therein approaches the threshold of insolubility of nickel phosphite, and must be discarded, so as to prevent the possibility of random decomposition thereof in the plating system.

The spent chemical nickel plating bath contains valuable nickel, hypophosphite and phosphite, as well as sodium and sulfate; whereby it is ordinarily subjected to gross nickel salvage by treatment that induces random decomposition thereof, the residue of the plating bath comprising an aqueous liquid having the previously mentioned metallic precipitate suspended therein. The matter of the treatment of the chemical nickel plating bath to induce random decomposition thereof is exceedingly easy, as this phenomenon involves the previously mentioned reactions that are autocatalytic; whereby the reactions, once initiated, rapidly spread throughout the plating bath and proceed substantially on a quantitative basis with respect to the two ingredients (nickel cations and hypophosphite anions) with the formation therein of the metallic precipitate mentioned. Thus, all of the nickel cations in the plating bath are depleted in the presence of the normal slight excess of hypophosphite anions; whereby the subsequent recovery of the metallic precipitate from the aqueous liquid effects the complete recovery of the nickel cations from the residue of the spent chemical nickel plating bath.

The initiation of the reactions mentioned is also exceedingly simple, as it is noted that a chemical nickel plating bath is normally in a metastable state and is subject to "spontaneous decomposition." Specifically, the simplest procedure of initiating the reactions is to seed the spent chemical nickel plating bath with a small quantity of previously produced metallic precipitate or a small quantity of any catalytic material in finely divided form, such as iron, cobalt, nickel, palladium, etc. Palladium is highly catalytic and may be employed even in the form of an aqueous solution of a salt thereof, such as the chloride, sulfate, etc. Also, the reactions in the spent chemical plating bath may be initiated by appropriately increasing the pH thereof, by raising the temperature thereof to the boiling point, etc. Since the reactions are autocatalytic, as previously noted, it is very convenient, as a matter of manipulation, to initiate the same in a small quantity of the spent chemical nickel plating bath contained in a beaker, or the like, and then return the contents of the beaker into the vat or tank containing the bulk of the spent chemical nickel plating bath, thereby seeding the reactions in the bulk of the spent chemical nickel plating bath, in an obvious manner.

Heretofore, chemical nickel platers have returned the metallic precipitate thus salvaged from spent chemical nickel plating baths to initial nickel processors; whereby such processors, in turn, have recovered the nickel content of the metallic precipitate by smelting operations, involving reducing agents; whereby the crude metallic nickel thus recovered has been refined by electrolytic operations for further use. Although, these nickel processors have been informed of the fact that the metallic precipitate thus salvaged from a spent chemical nickel plating bath also contains substantial phosphorus, they have always treated this contained phosphorus as "just another impurity" encountered in the smelting of nickel ores; whereby the phosphorus content of the metallic precipitate has been totally wasted in these smelting operations.

Perhaps the primary reason for this gross salvage of only the nickel ingredient of this metallic precipitate by the nickel processors has been a total misconception of the fundamental character and composition thereof. Recently, this metallic precipitate has been discovered to be an amorphous solid comprising a metastable undercooled solution of phosphorus in nickel, and having no specific composition, but normally containing, as produced incident to the random decomposition of a chemical nickel plating bath of the nickel cation-hypophosphite anion type, constituents comprising about 88 to 94% nickel and 6 to 12% phosphorus by weight. The phosphorus content is affected by the excess of both hypophosphite anions and phosphite anions in the spent chemical nickel plating bath, but only within the narrow range mentioned. Specifically, a high phosphite anion content, or a high hypophosphite anion content, in the spent chemical nickel plating bath insures that incident to random decomposition thereof the metallic precipitate produced will have a high phosphorus content within this narrow range, but the hypophosphite anion content, in the spent chemical nickel plating bath is by no means essential to the production of a high phosphorus content in the metallic precipitate. In fact, the metallic precipitate produced incident to the random decomposition of a pure simple freshly prepared standard aqueous solution of nickel sulfate and sodium hypophosphite always contains phosphorus in the range 6 to 12% by weight, frequently has a phosphorus content as high as 10% by weight, and occasionally has a phophorus content as high as 12% by weight. This phenomenon is not really understood, as the random decomposition of the same standard solution in two separate batches is not necessarily productive of identical samples of metallic precipitate, as to phosphorus content. It is suggested that the average character of the ultimately produced metallic precipitate may be greatly influenced by the character of the first few nuclei of the metallic precipitate that form in the solution, since the reaction is autocatalytic, and the character of these first few nuclei may depend entirely upon probability, within a very narrow range of permissible character.

Next, it has been discovered that when this metallic precipitate is heated to a temperature of about 400° C. an irreversible structural change occurs therethrough in an exceedingly short time interval, whereby the phosphorus that was in solution in the nickel reacts with the nickel to produce nickel phosphide ($Ni_3P$), which latter compound is dispersed in the form of micro-crystals in a matrix of nickel in the resulting mass. As the temperature of this resulting mass is elevated, the $Ni_3P$ crystals grow in the nickel matrix until ultimately a melt is obtained in the temperature range 880° C. to 1100° C., depending upon composition; whereby the nickel and phosphorus constituents are in equilibrium.

These considerations will be best understood by reference to FIG. 1 of the drawings, wherein there is illustrated a portion of the nickel-phosphorus system that is pertinent to the nickel-phosphorus compositions produced by the melting of the metallic precipitate noted. Specifically, it was discovered that the eutectic composition comprises nickel and phosphorus constituents containing about 89% nickel and 11% phosphorus by weight, and that the eutectic temperature is about 880° C. On the curve 11, the melting point of nickel (1453° C.) is indicated at 12, and the eutectic point is indicated at 13. Also, from the curve 11, it will be observed that a composition containing about 5% phosphorus has a melting point of about 1150° C., a composition containing about 6% phosphorus has a melting point of about 1100° C., a composition containing about 10% phosphorus has a melting point of about 950° C., and a composition containing about 12% phosphorus has a melting point of about 950° C.

The eutectic composition of the system is not completely understood, since it appears that it involves fundamentally nickel and $Ni_3P$, and since the proportions by weight are not in strict accordance with Dalton's law; however, repeated and accurate analysis always yields this ratio of nickel and phosphorus by weight, and only nickel and $Ni_3P$ have been detected in the alloy.

All of the compositions that are produced by melting of the metallic precipitate noted contain nickel and phosphorus in the previously mentioned range by weight (about 88–94% nickel and 6–12% phosphorus); and most of the compositions fall in the even more limited range containing about 90–93% nickel and 7–10% phosphorus by weight. Thus, it will be understood that when the metallic precipitate is heated to a temperature sufficiently high to melt the same, a melt is produced in which the nickel and phosphorus constituents are in equilibrium about the curve 61 of the phase diagram of FIG. 1. Upon subsequent cooling, the melt becomes supersaturated with nickel in the event the phosphorus content of the composition is below 11%; whereas upon subsequent cooling, the melt becomes supersaturated with $Ni_3P$ in the event the phosphorus content of the composition is about 11%. Specifically, in the event there is a deficiency of phosphorus the melt becomes supersaturated with nickel, upon subsequent cooling; whereby solid nickel is formed in the solution of the eutectic as the composition of the solution moves downwardly and toward the right along the curve 61 and toward the eutectic point 63; hence, when the cooling of the melt proceeds to the eutectic temperature of about 880° C. considerable solid nickel is present in the solution of the eutectic composition, so that upon further cooling of the mass, this solid nickel is productive of primary nickel crystals in the mass of the eutectic composition that appear as substantial nickel dendrites dispersed in the fine crystals of nickel and $Ni_3P$ comprising the fundamental constituents of the eutectic composition. Specifically, in the event there is an excess of phosphorus, the melt becomes supersaturated with $Ni_3P$, upon subsequent cooling; whereby solid $Ni_3P$ is formed in the solution of the eutectic as the composition of the solution moves downwardly and toward the left along the curve 61 and toward the eutectic point 63; hence, when the cooling of the melt proceeds to the eutectic temperature of about 880° C., considerable solid $Ni_3P$ is present in the solution of the eutectic composition, so that upon further cooling of the mass, this solid $Ni_3P$ is productive of primary $Ni_3P$ crystals in the mass of the eutectic composition that appear as small crystals of $Ni_3P$ dispersed in the fine crystals of nickel and $Ni_3P$ comprising the fundamental constituents of the eutectic composition. Accordingly, it is the melting of the metallic precipitate noted, followed by the subsequent cooling and solidifying of the melt, that is productive of the nickel-phosphorus alloy characterized by the eutectic composition having dispersed therein the primary crystals mentioned. As previously noted, in this metallic precipitate, there is normally an excess of nickel in the composition, whereby the nickel-phosphorus alloys produced are normally characterized by the dispersion therein of nickel dendrites.

From a broad point of view, as a matter of definition, the original nickel-phosphorus material resulting directly from the nickel cation-hypophosphite anion reaction (the amorphous solid material described) may be termed an "alloy," although it is not characterized by the eutectic composition noted; however, it is preferable to apply the term "alloy" to the final nickel-phosphorus material that results from the melting and subsequent solidifying of the original material mentioned, since this final material is characterized by the eutectic composition noted. Thus, hereinafter the term "alloy" will be used only to refer to this final material.

Now this nickel-phosphorus alloy is substantially different, as to characteristics and structure, from the solid nickel-phosphorus nickel that is chemically plated from a plating bath of the nickel cation-hypophosphite anion type and from the solid nickel-phosphorus material of the metallic precipitate. For examples, this nickel-phosphorus alloy is substantially magnetic, whereas the nickel-phosphorus plating and the metallic precipitate are substantially non-magnetic; and the specific resistance of this nickel-phosphorus alloy is considerably less than that of the nickel-phosphorus plating or the metallic precipitate. There are also many other physical and structural differences between this nickel-phosphorus alloy and the nickel-phosphorus plating and the metallic precipitate that are not here discussed at length in the interest of brevity.

Moreover, it will be understood that while the metallic precipitate must be melted to effect the production of the nickel-phosphorus alloy described above, it is not necessary to maintain the condition of the melt for any particular time interval.

The method of making the nickel-phosphorus alloy, described above, from the spent chemical nickel plating bath not only provides an efficient scheme of salvaging valuable nickel and phosphorus therefrom, but provides an exceedingly valuable alloy having many important uses, as explained more fully hereinafter; and it is emphasized that the salvage method is applicable to a wide variety of chemical nickel plating baths, such, for example, as those disclosed in the following U.S. patents: No. 2,532,283, Brenner and Riddell; No. 2,658,841, Gutzeit and Krieg; and No. 2,658,842, Gutzeit and Ramirez. Thus, the chemical nickel plater may select the chemical nickel plating bath that is best suited to his particular operation, and subsequently subject the spent chemical nickel plating bath to salvage in accordance with the present method, and regardless of the particular composition of the chemical nickel plating bath.

A preferred chemical nickel plating bath of extremely wide utility is disclosed in the copending application of Gregoire Gutzeit, Paul Talmey and Warren G. Lee, Serial No. 479,088, filed December 31, 1954, now Patent No. 2,822,293, granted February 4, 1958, this particular plating bath being admirably suited to the continuous plating process disclosed in the Talmey and Crehan patent. The chemical plating bath of the Gutzeit, Talmey and Lee application mentioned essentially comprises an aqueous solution of a nickel salt, a hypophosphite, a complexing agent selected from the group consisting of lactic acid and salts thereof, and an exalting additive selected from the group consisting of propionic acid and salts thereof. In this plating bath, the absolute concentration of hypophosphite is within the range 0.15 to 1.20 moles/liter, the ratio between nickel ions and hypophosphite ions is within the range 0.25 to 1.60, the absolute concentration of lactic ions is within the range 0.25 to 0.60 mole/liter, the absolute concentration of propionic ions is within the range 0.025 to 0.060 mole/liter, and the pH is within the approximate range 4.0 to 5.6.

This particular chemical nickel plating bath is most satisfactory in carrying out a wide variety of nickel plating operations; and, of course, when it becomes spent, it may be subjected to the present salvage method to produce the nickel-phosphorus alloy previously described.

It has also been discovered that the "stray" plating that may occur in an undesirable manner in a chemical nickel plating system of the character of that of the Talmey and Crehan patent may also be employed in the production of the nickel-phosphorus alloy described in the general manner disclosed above. In other words, this stray plating that accumulates in the bottom of the tank in which the chemical nickel plating bath is stored, in the filters of the system, etc., may be accumulated and melted in the manner described above, either alone or with the metallic precipitate mentioned, in order to produce the nickel-phosphorus alloy described. In fact, it has recently been discovered that this stray plating is also an amorphous solid comprising a metastable undercooled solution of phosphorus in nickel, and having no specific composition, but normally containing, as produced, constituents comprising about 88 to 94% nickel and 6 to 12% phosphorus by weight. Since the metallic precipitate mentioned and the stray plating mentioned are substantially identical, as a matter of composition, they may be melted together in order to produce the nickel-phosphorus alloy described.

As a matter of convenience in handling, the molten nickel-phosphorus alloy described may be cast into rods, bars, or other commercial forms, for subsequent use; whereby, such forms of the alloy, within themselves, comprise useful articles of convenience.

This method of making the nickel-phosphorus alloy is disclosed and claimed in the previously mentioned application of Crehan, Klouse and Talmey, Serial No. 514,472, filed June 10, 1955, now Patent No. 2,908,568.

Turning now to the utility of the nickel-phosphorus alloy that is produced by the present method, it is first noted that in a molten condition, it has very pronounced wetting and bonding characteristics; whereby it is generally useful as a coating material, and may be readily applied in a great variety of ways to a vast array of different base metal bodies after they have been subjected to standard degreasing, cleaning and pickling operations. Specifically, such an alloy coating may be applied to the cleaned surface of a base metal body by any one of the following groups of steps, in accordance with the present method:

(1) The cleaned base metal body is heated, and the alloy in molten condition is poured over the hot body in order to apply a "cast" coating of the alloy upon the body.

(2) The cleaned base metal body, at ambient temperature, is immersed in a molten mass of the alloy, and subsequently withdrawn with respect thereto, in order to apply a "hot-dipped" coating of the alloy upon the body.

(3) A mass of the alloy, at ambient temperature and in finely divided form, is sprinkled upon the cleaned surface of the base metal body, the body having been previously heated to a high temperature, in order to apply a "melted" coating of the alloy upon the body.

(4) A mass of the alloy, at ambient temperature and in finely divided form, is placed upon the cleaned surface of the base metal body, at ambient temperature, and the body and the carried alloy are transferred to a furnace or oven and heated, in order to apply an "oven melted" coating of the alloy upon the body.

(5) A portion of a bar of the alloy is melted with a torch, or the like, onto the heated and cleaned surface of the base metal body, in order to apply a "tinned coating" of the alloy upon the body.

(6) A mass of the metallic precipitate, or the stray plating in finely divided form, is sprinkled upon the cleaned surface of the base metal body, the body having been previously heated to a high temperature, in order to melt the mass, whereby upon subsequent cooling and solidifying of the melt, the alloy coating is formed in situ upon the body.

(7) A mass of the metallic precipitate, or the stray plating in finely divided form, is placed upon the cleaned surface of the base metal body, at ambient temperature, and the body and the carried mass are transferred to a furnace or oven and heated in order to melt the mass, whereby upon subsequent cooling and solidfying of the melt, the alloy coating is formed in situ upon the body.

(8) A portion of a bar of the compressed metallic precipitate, or the stray plating, is melted with a torch, or the like, onto the heated and cleaned surface of the base metal body; whereby upon subsequent cooling and solidifying of the melt, the alloy coating is formed in situ upon the body.

The foregoing suggestions are merely illustrative of the many ways in which the previously prepared alloy may be applied as a coating upon a body and in which the alloy may be made in situ from the melted metallic precipitate, or the strap plating, applied as a coating upon a body; and many other modes of producing such coatings will be immediately apparent to those skilled in the tinning, soldering, brazing, galvanizing and other metal-coating arts.

Turning now to the character of the base metal of the body that may be coated with this alloy, it is noted that the only limitation that has been discovered is that it must have a melting point sufficiently high that it is not appreciably melted in contact with the molten alloy at a temperature in the general range 880° C. to 1100° C., as the molten alloy must be heated to a temperature in this general range to obtain the desired liquid condition thereof. Also, the alloy in molten condition must wet and bond with repect to the cleaned surface of the base metal, but this condition does not comprise a substantial limitation, as the wetting and bonding characteristics of the molten alloy are outstanding; whereby even chrome-alloys and aluminum alloys are readily wet and bonded thereby. These peculiar wetting and bonding characteristics of the molten alloy are believed to flow from the circumstance that the phosphorus constituents of the melt are capable of reducing chromic oxide, as well as the various oxides of aluminum. In any case and without reference to the exact mechanism involved, the wetting and bonding characteristics of this nickel-phosphorus alloy are unusual; whereby there is no difficulty in producing satisfactory coatings upon the cleaned surfaces of a great variety of bodies formed of base metals, precious metals, or alloys thereof; which coatings are useful either as final protective coatings for the bodies thus coated or as uniting layers employed in securing such bodies to still other such bodies.

As a matter of fact, the present method removes a limitation with respect to the conventional chemical nickel plating process and concerning the catalytic character of the base metal. More particularly, in order to obtain plating upon the cleaned surface of a base metal from a chemical nickel plating bath of the nickel cation-hypophosphite anion type, the surface of the base metal must be catalytic to the plating reactions involved, so as to bring about the chemical reduction of the nickel cations and the deposition of the resulting metallic nickel, and the companion oxidation of hypophosphite anions to phosphite anions; all as previously explained in the Talmey and Crehan patent. However, in accordance with the present method, the nickel-phosphorus alloy has been previously produced, or is produced in situ incident to the cooling and solidifying of the melted metallic precipitate, or the stray plating; whereby it is not critical that the cleaned surface of the base metal be catalytic in order to obtain a coating thereon with the previously produced alloy, or the alloy thus produced in situ.

Referring now to FIG. 2 of the drawings, there is illustrated a composite metal sheet 21, embodying the features of the present invention, and comprising an intermediate sheet 22 formed of base metal, two outside sheets 23 and 24 formed of chrome-steel and two uniting layers 25a and 25b formed of nickel-phosphorus alloy, the alloy layer 25a being disposed between and intimately bonded to the adjacent surfaces of the sheets 22 and 23, and the layer 25b being disposed between and intimately bonded to the adjacent surfaces of the sheets 22 and 24.

The nickel-phosphorus alloy of the layers 25a and 25b contains about 88 to 94% nickel and 6 to 12% phosphorus by weight and comprises the eutectic composition mentioned including nickel and phosphorus constituents containing about 89% nickel and 11% phosphorus by weight, and having an eutectic temperature of about 880° C. Since the alloy ordinarily contains excess nickel with respect to the eutectic composition thereof, ordinarily, it has a melting point somewhat about the eutectic temperature and disposed in the approximate range 880° C. to 1100° C., depending upon the composition thereof. More particularly, this alloy is that which is automatically produced by the melting of the metallic precipitate, or by the melting of the stray plating, followed by cooling and solidifying of the melt, as previously described.

Turning now to the method of making the composite metal sheet 21, in accordance with the present invention, and referring to FIG. 2A, it is noted that all of the surfaces of the individual sheets 22, 23 and 24 are first thoroughly degreased, cleaned and lightly pickled in a suitable acid, such as hydrochloric acid; and then the alloy coating 25′ is applied to the cleaned exterior surfaces of the sheet 22 in any suitable manner and as previously described. The alloy coating 25′ is intimately bonded to the surfaces of the intermediate sheet 22 and comprises the two face portions 25a and 25b respectively carried by the two faces of the intermediate sheet 22 and the two edge portions 25c respectively carried by the two edges of the intermediate sheet 22.

For example, the alloy coating 25′ may be applied to the cleaned surfaces of the base metal sheet 22 by a "hot dipping" step and involving the immersion of the sheet 22 for a suitable time interval in a molten mass of the alloy.

Next, the sheets 22, 23 and 24 are stacked so that the face portions 25a and 25b of the layer 25′ are disposed in respective engagements with the adjacent cleaned face surfaces of the outer sheets 23 and 24. The edges of the sheets 22, 23 and 24 may be "tack-welded," if desired, in an obvious manner, not shown, in order to secure together the assembly, prior to fusion of the lay 25′, and in order to facilitate handling of the assembly.

Then the assembly is subjected to heat and pressure in order to effect selective fusion of the layer 25′; whereby the face portions 25a and 25b thereof respectively produce corresponding melts that are forced into wetting and bonding relation with the respective cleaned face surfaces of the outer sheets 23 and 24 in contact therewith, and also into wetting and bonding relation with the respective face surfaces of the intermediate sheet 22, in order to unite the assembly.

The assembly may be heated to effect the selective melting of the layer 25' in a furnace or oven; and it is preferable that the oven contain an inert atmosphere, such as nitrogen, as the assembly must be heated to a temperature in the approximate range 880° C. to 1100° C., in order to melt the layer 25', the melting point of this nickel-phosphorus alloy being in this general range and being variable depending upon the composition thereof. As previously explained, the required pressure may be effected upon the assembly in any suitable manner. For example, the assembly may be transferred from the oven upon melting of the layer 25', to a suitable press; whereby the assembly is retained under pressure until the melts cool and solidify, uniting the individual sheets 22, 23 and 24.

Alternatively, when the sheets 22, 23 and 24 are relatively narrow, so that they comprise what may be termed "strips," the heating and pressing steps may be conveniently combined in a single step by utilizing an electric resistance welding machine of the conventional roller-electrode type. In this operation, the assembly is passing between the two opposed roller-electrodes of the welding machine, so that the required pressure is exerted therebetween upon the stack of the individual sheets of the assembly; and simultaneously a substantial electric current is passed between the two roller-electrodes and through the assembly, so that the required heating of the face portions 25a and 25b of the layer 25' is effected. This combined step is well-suited to the method, since the face portions 25a and 25b of the layer 25' each has a high specific electrical resistance with respect to that of any one of the individual sheets 22, 23 and 24, so that the electric heating is preferentially concentrated in the face portions 25a and 25b of the layer 25'.

After cooling of the assembly, the edges thereof are trimmed to remove the surplus alloy, etc., thereby producing the finished composite metal sheet 21, as shown in FIG. 2.

In the foregoing description of the composite metal sheet 21, and the method of making the same, it has been assumed that the individual elements 22, 23 and 24 are sheets of the required thickness to produce the finished composite sheet 21 of the required structure upon the uniting of the individual elements 22, 23 and 24; however, this preferred form of the method is not essential thereto, as the individual elements 22, 23 and 24 may be of such thickness that they comprise "slabs," so that the united assembly comprises a "billet." In this case, the billet thus produced may be subjected to subsequent working operations, such as hot or cold rolling, forging, etc., to produce the composite metal sheet 21 of the required thickness. For example, in the finished structure 21 of FIG. 2, the total thickness may be 250-mils, the element 22 having a thickness of 200-mils, and each of the elements 23 and 24 having a thickness of 25-mils.

In the foregoing description of the method of making the composite metal sheet 21, it was assumed that the continuous coating 25' of nickel-phosphorus alloy was first applied to the intermediate sheet 22 before the stacking of the individual sheets 22, 23 and 24 in order to produce the assembly to be subsequently worked to effect the uniting thereof; all as described in conjunction with FIG. 2A. However, as an alternative method, the individual sheets 22, 23 and 24 may be stacked with the alloy of the metallic precipitate or the stray plating layers 25a' and 25b' respectively carried by the individual sheets 22 and 24 in producing the assembly, and before further working to effect uniting. In this regard, the layer 25b' may be first placed upon the cleaned upper face of the outside sheet 24 in the form of the metallic precipitate, or the stray plating in finely divided form, containing the nickel and phosphorus constituents, and before the production of the nickel-phosphorus alloy. Then the intermediate sheet 22 may be stacked upon the layer 25b', with the lower cleaned surface thereof in direct contact therewith. Then the layer 25a' of previously produced nickel-phosphorus alloy in finely divided form may be placed upon the cleaned upper face of the intermediate sheet 22; and then the outer sheet 23 may be stacked upon the layer 25a' with the lower cleaned surface thereof in direct contact therewith. Finally, the edges of the sheets 22, 23 and 24 may be suitably secured together in order to retain the assembly in place preceding further working.

In this case, when the assembly is subjected to heat and pressure, in the manner previously explained, the layer 25a' of finely divided nickel-phosphorus alloy produces a corresponding melt, while the layers 25b' of metallic precipitate, or stray plating in finely divided form, produces a corresponding melt and is converted into the nickel-phosphorus alloy upon cooling and solidifying, in the manner previously explained. This alternative procedure within itself comprises alternative procedures, as it is apparent that the layer disposed between each two of the sheets 22, 23 and 24 may comprise either the previously produced nickel-phosphorus alloy in finely divided form or the metallic precipitate, or the stray plating in finely divided form. Accordingly, it will be understood that in the event the layer disposed between two of the sheets comprises nickel-phosphorus alloy in finely divided form, only melting of the previously produced alloy is involved. On the other hand, in the event the layer disposed between two of the sheets comprises the metallic precipitate, or the stray plating in finely divided form, both melting and alloying of the nickel and phosphorus constituents are involved. However, in any case, the ultimate result is the same that there is provided a uniting layer of nickel-phosphorus alloy between the two sheets.

Also, in the foregoing description of the composite metal sheet 21, and the method of making the same, it has been assumed that it is desirable to produce a structure in which both sides of a base metal sheet are cladded by chrome-steel sheets; however, this structure of the composite metal sheet 21, as shown in FIG. 2, is unusual and was selected only for the purpose of illustrating the broad application of the present method. More particularly, it is ordinarily necessary to effect cladding of only one side of a base metal sheet; whereby the composite metal sheet 31 of FIG. 3 comprises the common form of the structure embodying the present invention. Specifically, the composite metal sheet 31 comprises a base metal sheet 34, a chrome-steel sheet 33, and an intermediate uniting layer of nickel-phosphorus alloy 35a.

The method of making the composite metal sheet 31 is the same as that described in the making of the composite metal sheet 21 and is not repeated in the interest of brevity.

Referring now to FIG. 4, another modified form of the composite metal sheet 41 is illustrated that comprises two identical base metal sheets 43 and 44 and an intermediate uniting layer 45a of nickel-phosphorus alloy; and referring to FIG. 5, a further modified form of the composite metal sheet 51 is illustrated that comprises two identical chrome-steel sheets 53 and 54, and an intermediate uniting layer 55a of nickel-phosphorus alloy. The composite metal sheets 41 and 51 are also made in accordance with the present method, as described above, in the making of the composite metal sheets 21 and 31; whereby it will be understood that the composite metal sheets and methods of the present invention are by no means limited to structures involving a base metal sheet that is cladded with a chrome-steel sheet. The important point in this regard resides in the fact that the present method is applicable to the making of such composite metal sheets involving one or more sheets orm formed of metals containing substantial chromium, in view of the usual interference of the chromium with wetting and bonding by the formation of chromic oxide upon the surface of the sheet containing any substantial amount of chromium. These melting and bonding characteristics of the nickel-phosphorus ally are, by no means, peculiar to chromium, but are general characteristics; whereby aluminum and its alloys are readily wet and bonded by the melt, notwithstanding the usual aluminum oxides on the surface of such aluminum alloy sheets.

Reconsidering the present method, it is pointed out that the nickel-phosphorus alloy comprising the uniting layer between the two metal sheets may have been previously produced by the melting of the metallic precipitate recovered from a chemical plating bath of the nickel-cation-hypophosphite anion type following random decomposition thereof, or alternatively the nickel-phosphorus alloy comprising the uniting layer between the two metal sheets may be produced in situ by the melting of the metallic precipitate mentioned, or the stray plating mentioned, and incident to the uniting of the two metal sheets.

As previously explained, there is no particular or critical limitation with regard to the composition of the metal of any one of the individual metal sheets involved in the composite metal sheet; however, as a practical matter, in the production of such composite metal sheets the most important industrial metals comprise: iron and its alloys, cobalt and its alloys, nickel and its alloys, copper and its alloys, silver and its alloys, gold and its alloys, palladium and its alloys and platinum and its alloys.

For example, in each of the composite metal sheets 21, 31, 41 and 51, the metal of at least one of the individual sheets incorporated therein will ordinarily comprise one of the following elements or alloys: iron, carbon-steel, chrome-steel, cobalt-steel, silicon-steel, manganese-steel, nickel-steel, molybdenum-steel, nickel-cobalt-steel, nickel-chrome-steel, chrome-manganese-steel, manganese-molybdenum-steel, chrome-copper-nickel-steel, copper, brass, bronze, silicon-bronze, Phosphor-bronze, beryllium-copper, cadmium-copper, chromium-copper, nickel-copper, aluminum, aluminum-brass, aluminum-bronze, silver, palladium-silver, nickel-silver, copper-silver, zinc-copper-silver, zinc-cadmium-copper-silver, gold, copper-gold, copper-silver-platinum-gold, copper-silver-palladium-gold, platinum, gold-platinum, silver-platinum, iridium-platinum, rhodium-platinum, palladium-platinum, tungsten-platinum, nickel-platinum, ruthenium-platinum, gold-silver-platinum, palladium-gold-platinum, palladium, copper-gold-palladium, nickel, chromium-nickel, and cobalt.

Thus, the cladding arrangement is of exceedingly wide utility, embracing the cladding of base metals with the full range of stainless steels, with silver (of the general character of Sheffield plate), etc.

In view of the foregoing, it is apparent that there has been provided an improved method of coating base metal bodies with a nickel-phosphorus alloy, as well as an improved article of manufacture comprising such coated metal bodies. Further, there has been provided an improved method of making a composite metal sheet that involves two individual metal sheets and an intermediate uniting layer of nickel-phosphorus alloy, wherein the alloy layer possesses outstanding wetting and bonding characteristics permitting the union of the two individual metal sheets when they are formed of a great variety of metals.

The metal body provided with the coating of nickel-phosphorus alloy is very advantageous in view of the facts that the coating is tenaciously bonded to the surface of the metal body and subject to no blistering, peeling or spalling in use, and is characterized by adhesion, wear resistance and resistance to corrosive attack by ordinary acids, bases and other reagents, comparable (in fact, superior) to electrodeposited nickel. Moreover, the composite metal sheet including the two or more individual sheets united by the corresponding one or more nickel-phosphorus layers is very advantageous in view of the fact that the two or more individual metal sheets thereof are securely united and subject to no separation or relative movements incident to subsequent working (rolling, drawing, cutting, etc.) of the composite metal sheet in the formation therefrom of ultimate articles of manufacture.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of coating a metal body; which method comprises providing a recovered mass of metallic precipitate produced by decomposition of a "spent" chemical nickel plating bath containing nickel cations and hypophosphite anions and phosphite anions and comprising about 88 to 94% nickel and about 6 to 12% phosphorus by weight, heating said mass of metallic precipitate to produce a melt therefrom, cleaning the surface of said metal body, contacting the cleaned surface of said metal body with said melt in order to provide a layer of said melt in wetting and bonding relation therewith, whereby upon subsequent cooling and solidifying of said melt a nickel-phosphorus alloy coating is provided that is intimately bonded to said cleaned surface of said metal body, said alloy being characterized by an eutectic composition comprising constituents containing about 89% nickel and 11% phosphorus by weight and having an eutectic temperature of about 880° C.

2. The method of coating a metal body; which method comprises providing in finely divided form a recovered mass of metallic precipitate produced by decomposition of a "spent" chemical nickel plating bath containing nickel cations and hypophosphite anions and phosphite anions and comprising about 88 to 94% nickel and about 6 to 12% phosphorus by weight, cleaning the surface of said metal body, applying said finely divided mass of metallic precipitate to the cleaned surface of said metal body, and heating said metal body and said mass of finely divided metallic precipitate at a temperature below the melting point of said metal body and above the melting point of said mass of metallic precipitate in order selectively to melt said mass of metallic precipitate and to flow a layer of the resulting melt into wetting and bonding relation with the cleaned surface of said metal body, whereby upon subsequent cooling and solidifying of said melt a nickel-phosphorus alloy coating is provided that is intimately bonded to said cleaned surface of said metal body, said alloy being characterized by an eutectic composition comprising constituents containing about 89% nickel and 11% phosphorus by weight and having an eutectic temperature of about 880° C.

3. The method of uniting two metal bodies; which method comprises providing a recovered mass of metallic precipitate produced by decomposition of a "spent" chemical nickel plating bath containing nickel cations and hypophosphite anions and phosphite anions and comprising about 88 to 94% nickel and about 6 to 12% phosphorus by weight, heating said mass of metallic precipitate to produce a melt therefrom, cleaning two surfaces respectively provided on said two bodies, arranging said two bodies and a layer of said melt so that said two cleaned surfaces are disposed in adjacent facing spaced-apart relation with said layer of said melt therebetween in wetting and bonding relation therewith, whereby upon subsequent cooling and solidifying of said melt a nickel-phosphorus alloy coating is provided that is intimately bonded to said cleaned surfaces of said metal bodies securely uniting said two metal bodies, said alloy being characterized by an eutectic composition comprising constituents containing about 89% nickel and 11% phosphorus by weight and having an eutectic temperature of about 880° C.

4. The method set forth in claim 3, wherein the metal of at least one of said two metal bodies contains sufficient chromium substantially to interfere with ready wetting and bonding.

5. The method of making a composite metal sheet including two individual sheets and an intermediate uniting layer of nickel-phosphorus alloy; which method comprises providing a recovered mass of metallic precipitate produced by decomposition of a "spent" chemical nickel plating bath containing nickel cations and hypophosphite anions and phosphite anions and comprising about 88 to 94% nickel and about 6 to 12% phosphorus by weight and having a melting point well below that of the metal of either of said two individual sheets, cleaning two surfaces respectively provided on said two individual sheets, applying a layer of said mass of metallic precipitate to at least one of said two cleaned surfaces, stacking said two individual sheets so that said two cleaned surfaces are disposed in adjacent facing spaced-apart relation with said mass of metallic precipitate therebetween and in contact therewith, and subjecting said stack to heat and pressure so as selectively to melt said mass of metallic precipitate and to flow the resulting melt into wetting and bonding relation mutually with said two adjacent cleaned surfaces in contact therewith, whereby upon subsequent cooling and solidifying of said melt a nickel-phosphorus alloy is provided that is intimately bonded to said cleaned surfaces of said two sheets securely to unite said two sheets, said alloy being characterized by an eutectic composition comprising constituents containing about 89% nickel and 11% phosphorus by weight and having an eutectic temperature of about 880° C.

6. The method set forth in claim 5, wherein the metal of at least one of said two sheets contains sufficient chromium substantially to interfere with ready wetting and bonding.

References Cited in the file of this patent

UNITED STATES PATENTS

| | | |
|---|---|---|
| 2,232,176 | Guthrie | Feb. 18, 1941 |
| 2,397,400 | Barwick | Mar. 26, 1946 |
| 2,795,040 | Antel et al. | June 11, 1957 |
| 2,798,843 | Slomin et al. | July 9, 1957 |
| 2,908,568 | Crehan et al. | Oct. 13, 1959 |

FOREIGN PATENTS

| | | |
|---|---|---|
| 487,263 | Great Britain | June 17, 1938 |

OTHER REFERENCES

Journal of Research of the National Bureau of Standards, November 1947, vol. 39, No. 5, pages 385–395. Copy in Scientific Library.

Scholder et al.: "Zeitschreft fur Anorganische und Allgemeine Chemie," vol. 198, No. 4, pages 329–351 (1931). Copy in Scientific Library.